United States Patent [19]
Delecroix

[11] 3,731,788
[45] May 8, 1973

[54] ARTICLE SELECTING DEVICE
[75] Inventor: Patrick Delecroix, Hem, France
[73] Assignee: Societe Anonyme Lan Redoute, Roubaix, France
[22] Filed: Sept. 2, 1971
[21] Appl. No.: 177,274

Related U.S. Application Data
[63] Continuation-in-part of Ser. No. 819,734, April 28, 1969.

[30] Foreign Application Priority Data
Aug. 14, 1968 France..................................6819169

[52] U.S. Cl..................................................198/103
[51] Int. Cl...............................................B65g 37/00
[58] Field of Search..........................198/25, 42, 103, 198/78-79; 214/16 B; 186/1.2; 221/86

[56] References Cited
UNITED STATES PATENTS
747,216  12/1903  Pedersen..............................221/86

Primary Examiner—Edward A. Sroka
Attorney—Robert E. Burns et al.

[57] ABSTRACT

A device for picking-up articles selected among those arranged in a storage area is described as having the conveyor displacing containers each intended to receive article of a limited number of selections and passing under at least one wheel divided into sector-shaped compartments whose rotational movement is synchronized with that of the conveyor in such a way that each compartment always received the articles intended for the same container.

4 Claims, 3 Drawing Figures

Fig_1

Patented May 8, 1973

ARTICLE SELECTING DEVICE

CROSS-REFERENCES TO RELATED APPLICATIONS

This application is a continuation-in-part of application Ser. No. 819,734 entitled "Article Selecting Device" and filed on Apr. 28th, 1969.

BACKGROUND OF THE INVENTION

This invention relates to apparatus for conveying selected articles from a storage zone to a predetermined zone spaced from the storage zone.

Up to now, the problem of conveying to various destinations, different articles required among those stored in a storage zone is far from being resolved. It is known to manually convey one order at a time, which is not conducive to efficiency and requires much coming and going on the part of the personnel.

There is also known the process which consists in selecting articles for various orders (e.g. 1,000) by classifying them often mechanographically, in the order in which the articles are arranged in the storage zone; these articles, selected in bulk, are then apportioned order by order. Unfortunately, this apportionment of various orders causes a considerable loss of time.

To remedy this, certain manufacturers have made installations consisting of a conveyor circulating in front of the storage workers and comprising hoppers intending for one order or for a very limited number of orders, this conveyor passing in all the pick-up alleys in the storage zone.

This circulation in all the alleys requiring the conveyor to uselessly traverse a considerable distance and accordingly it was replaced by several conveyors circulating each in one of several alleys and feeding at the end of their travel a main conveyor. Additionally, if often required, articles are located in the same zone, it happens that the person in charge of the pick-up does not have the time to place all the orders in their respective hoppers which move continuously, unless the conveyor moves very slowly.

SUMMARY OF THE INVENTION

The present invention which has for its purpose to avoid all these drawbacks comprises an apparatus for conveying articles selected from amongst those located in an orderly fashion in a storage zone.

It is characterized in that in comprises a conveyor carrying spaced containers intended to receive each article of a limited number of selections, the conveyor passing under at least one wheel divided into sector-shaped compartments, the rotational movement of which wheel is synchronized with that of the conveyor in such a way that each compartment always receives the articles intended from the same container.

BRIEF DESCRIPTION OF THE DRAWING

An embodiment of the invention will now be described by way of example, with reference to the figures of the accompanying drawings in which.

DESCRIPTION OF THE PREFERRED EMBODIMENT

Figure 1:
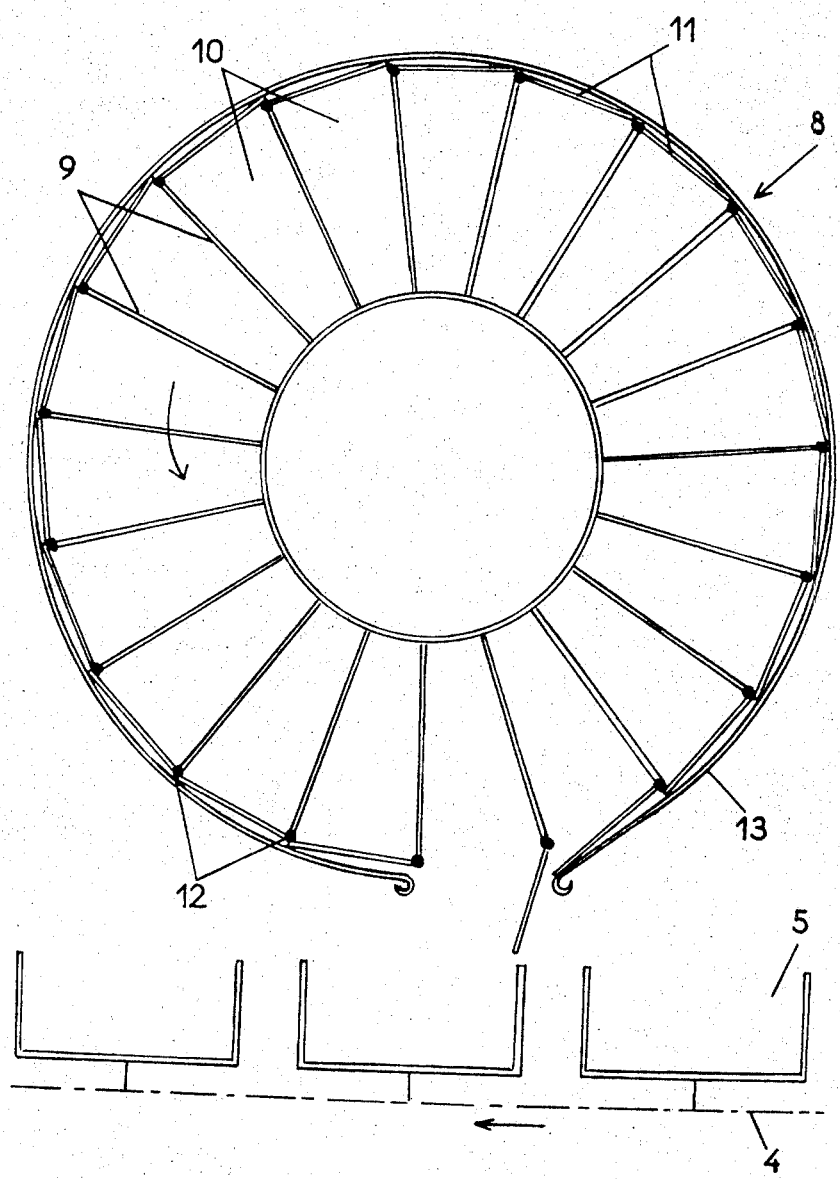
FIG. 1 is a schematic side view of an apparatus of the invention.
Figure 2:
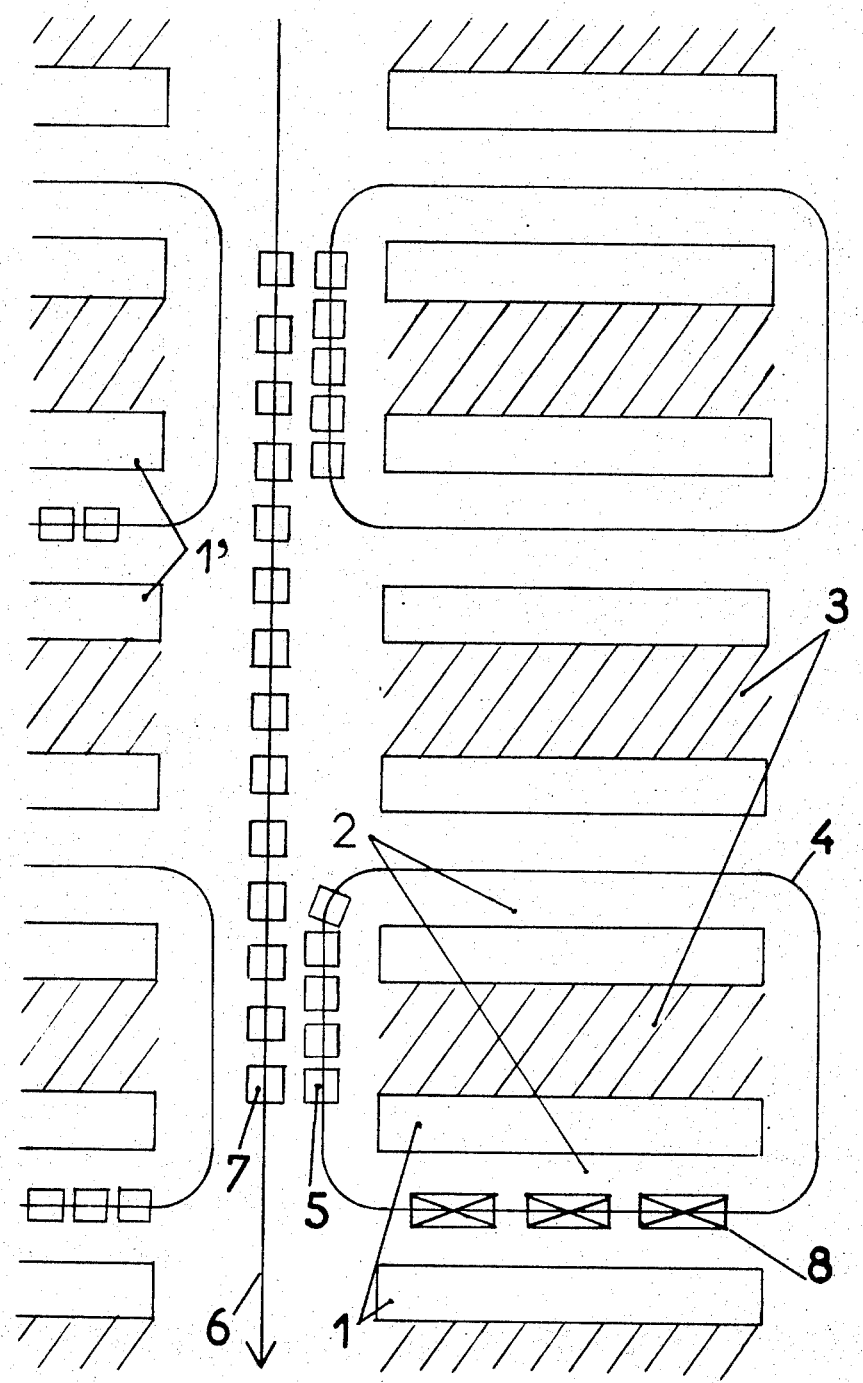
FIG. 2 is a schematic plan view of an installation using the apparatus of the invention.

The installation shown in FIG. 2 comprises an arrangement of rows 1 of storage lockers accessible from either side of the alleys.

These alleys are alternately reserved for picking-up (alley 2) and supply (alley 3).

Along consecutive pick-up alleys there is arranged on a closed circuit a conveyor 4 for supporting containers 5. Each container 5 is intended to receive articles of only one or a very limited number of orders.

Perpendicularly to the pick-up alleys circulates a main conveyor 6 each of whose containers receives articles contained in a particular container 5.

In each pick-up alley 2 is placed above conveyor 4 at least one wheel 8 of an apparatus according to this invention.

Figure 3:
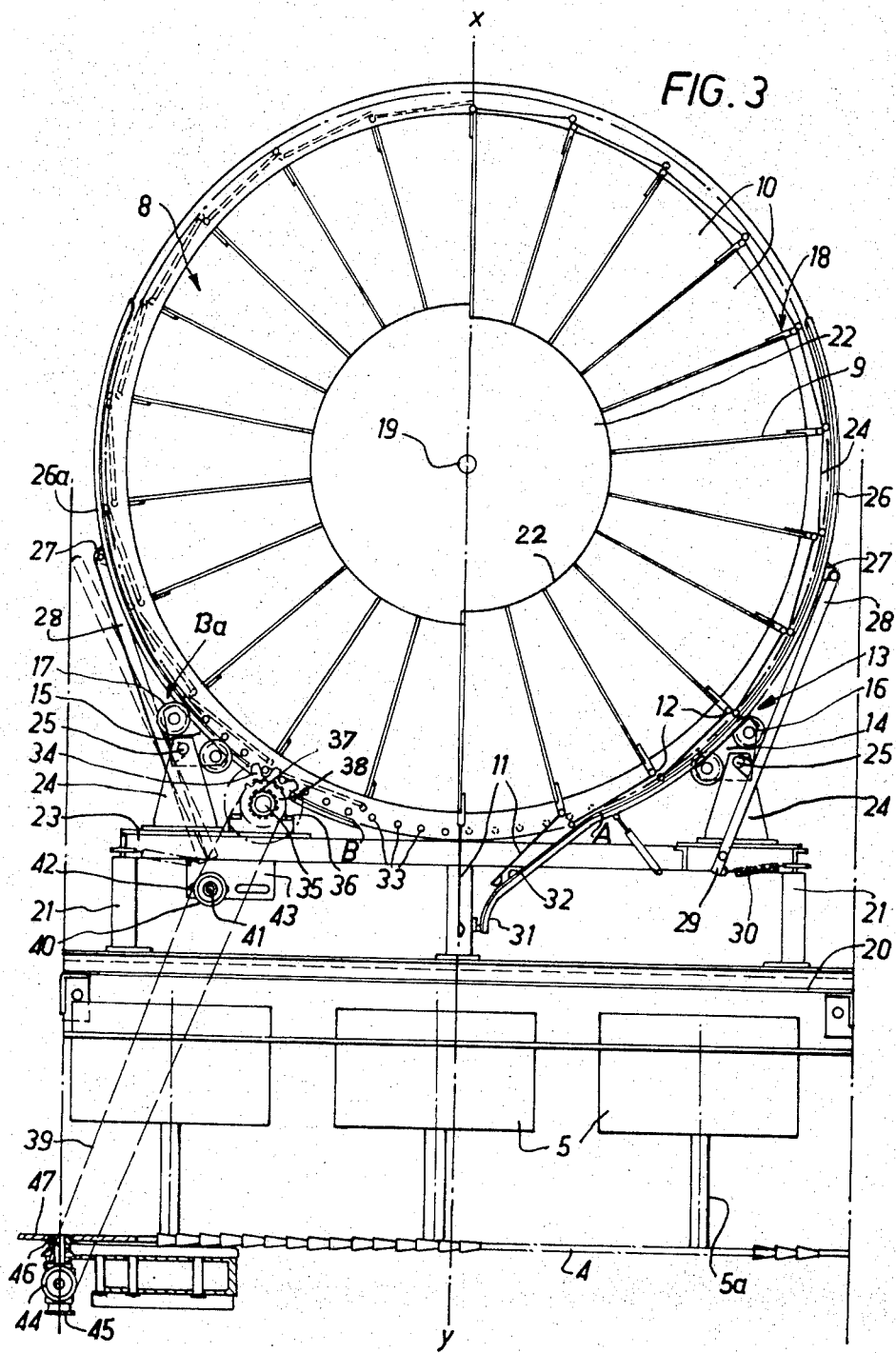
FIG. 3 is a side view of an apparatus.

Now reference will be made more particularly to FIG. 3 to describe in detail a typical form of embodiment of the apparatus of this invention. This apparatus comprises the endless chain conveyor 4 to which are secured (by means of suitable members designated diagrammatically at 5a) the carriages or containers 5 adapted to receive the selected articles. Overlying these carriages or containers 5 is a false horizontal floor 20 to which are secured the legs 21 of a frame structure 23. This frame structure carries a pair of straps 24 disposed symmetrically in relation to a transverse vertical plane $x$–$y$ and having pivoted thereto, about pivot pins 25, rockers 14, 15 supporting rollers 16, 17 respectively. A storage wheel 8 bears on these rollers through the medium of a pair of front and rear rings 18 rigid with a common shaft 19. The two rings 18 are assembled by radial partitions 9 forming therebetween compartments 10 having the shape of annular sectors. The radial partitions 9 are secured at their inner end to a central hub 22 rigid with the wheel shaft 19.

Each compartment 10 is closed on its peripheral side, between the two rings 18, by a trap door 11 pivotally mounted about a pivot pin 12 carried by the outer edge of the relevant front radial partition 9, considering the direction of rotation of the wheel which is the counter-clockwise direction, as seen in the drawing in the upper half portion of the wheel the trap doors 11 are held in their closed position by gravity.

To keep these trap doors 11 closed along the outer periphery of the lower half of the wheel, except along an arc extending on either side of the vertical plane $x$–$y$, a pair of devices or cam means 13 and 13a are provided along the left-hand and right-hand lower quadrants of the wheel. These cam means comprise flanges 26 and 26a, respectively, in the form of cylindrical segments, which engage the flap doors 11. These flanges 26, 26a are disposed substantially symmetrically to the aforesaid vertical plane $x$–$y$ and extend each along an arc of about 90° and their lower ends A and B, spaced from each other on either side of said vertical plane $x$–$y$, will thus form an aperture through which the trap doors 11 can open freely by gravity. Since the wheel 8 revolves in the counter-clockwise direction the flap doors 11 open automatically by pivoting about their pivot pins 12 immediately after the rear edge of the trap door (seen in the direction of rotation of the wheel) leaves the lower end B of the left-hand flange 26a.

To close the trap doors 11 a gradual closing ramp 32 is provided with constitutes the right-hand flange 26 of which the lower end 31 lies in close vicinity of the vertical plane x–y, slightly on the right thereof. Therefore, the movable end of any trap door 11 which is then open in its vertical position will engage the lower end 31 of ramp 32, then slide thereon towards the flange 26, thus causing a pivotal movement of the corresponding trap door 11 in the clockwise direction about its axis 12, so that these trap doors are re-closed while remaining in contact with the right-hand flange 26.

The two cams or like devices 13 and 13a holding the trap doors 11 in their closed position are resiliently mounted to permit the passage of bulky articles. To this end, each flange 26 and 26a carries a strap 27 to which one end of a lever 28 is pivoted, this lever being pivoted in turn about the shaft 25 carried by each strap 24.

The lower end 29 of lever 28 is pulled by a tension spring 30 attached to the frame structure 23. Thus, both flanges 26 and 26a engage the trap doors 11 with a flexibility sufficient to permit the passage, if necessary, of a trap door 11 slightly open due to the presence of abnormally bulky articles in the corresponding compartment 10 and avoid any jamming of the wheel 8.

The outer faces of rings 18 carry on a common circumference and at a constant angular spacing a plurality of studs 33 engaged by pinions 34 wedged to a shaft 35 revolving freely in a strap 36 rigid with frame structure 23. Also wedged to this shaft 35 are toothed wheels 37 and 38 of different diameters, one of these wheels being in meshing engagement with a driving chain 39. This chain 39 is passed over a tension roller 40 mounted for free rotation about a shaft 41 in an elongated hole 42 of a bracket 43 rigid with the frame structure 23. The chain 39 also passes over a driving toothed wheel 44 of a bevel gear 45 the input shaft 46 of which carries a plate 47 rotatably driven from the chain 1 controlling the movements of carriages 5.

The movement of carriages or containers 5 is therefore perfectly synchronized with the rotation of wheel 8 revolving at a speed proportional to the velocity of translation of said carriages or containers 5. The set of toothed whells 37, 38 permits of varying the transmission ratio and obtaining different rotational speed of wheel 8, so that if necessary, a same container 5 may be fed from a plurality of successive compartments 10 of the same wheel 8 by causing the latter to rotate at a sufficient speed.

The direction of rotation of wheel 8 in relation to the direction of translation of carriages or containers 5 is immaterial. The compartments 10 may travel in the lower portion of the wheel, i.e. above the aperture A – B through which the articles are allowed to fall, either in a direction opposed to that of the carriages or containers 5, as shown in FIG. 3, or in the same direction. It is only necessary to mark in a suitable manner the various compartments 10 as a function of the carriage or carriages 5 to be filled.

If a plurality of wheels 8 are used for supplying articles to a same conveyor, their compartments 10 are of course shifted as a function of the number of intermediate carriages to be supplied with articles.

Since the wheel 8 bears simply on rollers 16 and 17, it can easily be removed for substituting another wheel therefor, and on the other hand since the rollers 16 and 17 are mounted on rockers 14, 15 any possible warp or out-of-true of the wheel is easily absorbed. With the above-described apparatus it is clear that after the selected articles have been disposed into the various compartments 10 by the operator (by introducing the articles laterally into the compartments) these compartments are discharged automatically as they travel over the carriages 5 corresponding thereto, due to the automatic gravity opening the flap door 11 closing each compartment. The operator may thus introduce other articles into the previously emptied compartments and thus the operator can work with a certain "lead" in relation to the conveyors, the time thus saved being available for picking up in succession articles lying in a same zone, in case of momentary excess of orders for the articles.

What I claim is:

1. An apparatus for introducing various selected groups of articles into various containers carried by an endless conveyor from a storage zone to a delivery zone spaced from said storage zone, which comprises an endless conveyor running between said storage zone and said delivery zone, a plurality of spaced apart containers mounted for movement with the conveyor towards said delivery zone, at least one wheel rotatably mounted above the conveyor in said storage zone, means for continuously rotating said wheel, the axis of rotation of the wheel being arranged horizontally and transversally of the conveyor, a plurality of radially extending partitions dividing the wheel into a plurality of continuous sector shaped compartments, a trap door associated with each compartment, said trap doors forming a peripheral wall of said wheel, a cam for maintaining said trap doors in closed position during the lower part of the rotary movement of said wheel, said cam substantially surrounding the lower part of the periphery of the wheel, the trap doors of the compartments each being hinged along one edge to an end of a radial wall, the opposite edge engaging the cam to maintain the trap doors closed, said cam having an aperture at the bottom of said wheel and immediately above the conveyor which aperture permits the trap doors to swing open under gravity when they are aligned with the aperture, means for resiliently pressing said cam against said trap doors, and means for synchronizing the movement of the conveyor with the rotation of the wheel and the opening of said trap doors so that the contents of selected compartments can fall through their respective trap doors into selected containers.

2. Apparatus as set forth in claim 1, wherein said cam adapted to keep said trap doors in their closed position comprises a pair of flanges having the shape of cylindrical sectors, disposed substantially symmetrically on either side of a vertical plane containing the axis of rotation of the wheel and having their lower ends spaced from each other and adapted to bound the aperture at the bottom of said wheel, each flange being resiliently urged against the outer periphery of said wheel.

3. Apparatus as set forth in claim 2, which comprises a frame structure supporting said wheel for free rotation, a pair of levers pivotally mounted to said frame structure and having pivoted to their upper portions said two flanges respectively, and a pair of tension springs attached with one end to said frame structure and with the other end to said two levers respectively for resiliently urging said flanges against the outer periphery of said wheel.

4. Apparatus as set forth in claim 3, which comprises a pair of supports mounted to said frame structure on either side of the vertical plane containing the axis of rotation of said wheel, a pair of rockers pivoted to said supports respectively, and rollers carried by each rocker, said wheel being freely supported by said rollers.

* * * * *